US012278387B2

(12) United States Patent
Wang et al.

(10) Patent No.: US 12,278,387 B2
(45) Date of Patent: Apr. 15, 2025

(54) BATTERY PACK AND APPARATUS

(71) Applicant: CONTEMPORARY AMPEREX TECHNOLOGY (HONG KONG) LIMITED, Hong Kong (CN)

(72) Inventors: Yongguang Wang, Ningde (CN); Yu Tang, Ningde (CN); Kaijie You, Ningde (CN); Xingdi Chen, Ningde (CN); Yanbo Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 631 days.

(21) Appl. No.: 17/564,551

(22) Filed: Dec. 29, 2021

(65) Prior Publication Data
US 2022/0123423 A1 Apr. 21, 2022

Related U.S. Application Data

(63) Continuation of application No. PCT/CN2020/118765, filed on Sep. 29, 2020.

(30) Foreign Application Priority Data
Nov. 8, 2019 (CN) .......................... 201911085794.5

(51) Int. Cl.
*H01M 50/308* (2021.01)
*H01M 50/204* (2021.01)
(Continued)

(52) U.S. Cl.
CPC ....... *H01M 50/308* (2021.01); *H01M 50/204* (2021.01); *H01M 50/249* (2021.01);
(Continued)

(58) Field of Classification Search
CPC ... H01M 50/30; H01M 50/308; H01M 50/317
See application file for complete search history.

(56) References Cited

U.S. PATENT DOCUMENTS 8,475,952 B2 7/2013 Yasui et al.
8,956,747 B2 2/2015 Itoi et al.
(Continued)

FOREIGN PATENT DOCUMENTS

CN 102473884 A 5/2012
CN 103081164 A 5/2013
(Continued)

OTHER PUBLICATIONS

Extended European Patent Application No. EP 20883829.2 received in European Patent Application No. EP 20883829.2.

*Primary Examiner* — Amanda C. Walke
(74) *Attorney, Agent, or Firm* — Scully, Scott, Murphy & Presser, P.C.

(57) ABSTRACT

A battery pack and an apparatus, relating to the field of energy storage devices. The battery pack includes: a first box body, where the first box body includes a frame and a cross beam, the cross beam is disposed within the frame, and the cross beam has a hollow structure and is provided with an exhaust vent; a baffle plate, connected to the cross beam and sealing the exhaust vent; and a battery cell, accommodated in the first box body and including an explosion-proof valve, where the explosion-proof valve faces towards the baffle plate. The baffle plate is configured to exit a state of sealing the exhaust vent when the explosion-proof valve of the battery cell bursts.

15 Claims, 8 Drawing Sheets

(51) Int. Cl.
*H01M 50/249* (2021.01)
*H01M 50/262* (2021.01)
*H01M 50/317* (2021.01)

(52) U.S. Cl.
CPC ....... *H01M 50/262* (2021.01); *H01M 50/317* (2021.01); *H01M 2220/20* (2013.01)

(56) References Cited

U.S. PATENT DOCUMENTS

| | | | |
|---|---|---|---|
| 9,231,237 | B2 | 1/2016 | Shimizu et al. |
| 10,003,055 | B2 | 6/2018 | Shimizu et al. |
| 10,644,287 | B2 | 5/2020 | Shimizu et al. |
| 2011/0200856 | A1 | 8/2011 | Yasui et al. |
| 2012/0164490 | A1 | 6/2012 | Itoi et al. |
| 2012/0263982 | A1 | 10/2012 | Yasui et al. |
| 2013/0095356 | A1 | 4/2013 | Shimizu et al. |
| 2014/0113167 | A1 | 4/2014 | Itoi et al. |
| 2015/0140369 | A1 | 5/2015 | Itoi et al. |
| 2015/0303422 | A1 | 10/2015 | Poller et al. |
| 2016/0204404 | A1 | 7/2016 | Shimizu et al. |
| 2018/0269448 | A1 | 9/2018 | Shimizu et al. |
| 2019/0296293 | A1 | 9/2019 | Scharner |
| 2019/0334145 | A1 | 10/2019 | Omura et al. |
| 2021/0050572 | A1 | 2/2021 | Omura et al. |
| 2022/0059901 | A1 | 2/2022 | Ren et al. |

FOREIGN PATENT DOCUMENTS

| | | | |
|---|---|---|---|
| CN | 102197531 B | | 11/2013 |
| CN | 203910881 U | | 10/2014 |
| CN | 102714289 B | | 8/2015 |
| CN | 105531846 A | | 4/2016 |
| CN | 208738329 U | | 4/2019 |
| CN | 209104229 U | | 7/2019 |
| CN | 110140233 A | | 8/2019 |
| CN | 110190211 A | | 8/2019 |
| CN | 209249548 U | | 8/2019 |
| CN | 209357799 U | | 9/2019 |
| CN | 209401662 U | | 9/2019 |
| CN | 110323385 A | | 10/2019 |
| CN | 110416452 A | | 11/2019 |
| CN | 215816098 U | * | 2/2022 |
| DE | 102011054775 A1 | | 4/2013 |
| DE | 102014102053 A1 | | 8/2015 |
| EP | 2475028 A1 | | 7/2012 |
| EP | 2506336 A1 | | 10/2012 |
| JP | 2007027011 A | | 2/2007 |
| JP | 2010108823 A | | 5/2010 |
| JP | 2011090929 A | * | 5/2011 |
| JP | 2011175844 A | | 9/2011 |
| JP | 2013037873 A | | 2/2013 |
| JP | 2013110040 A | | 6/2013 |
| JP | 5341156 B2 | | 11/2013 |
| JP | 2015228295 A | | 12/2015 |
| JP | 6251972 B2 | | 12/2017 |

* cited by examiner

BATTERY PACK AND APPARATUS

CROSS-REFERENCE TO RELATED APPLICATIONS

This application is a continuation of International Application No. PCT/CN2020/118765, filed on Sep. 29, 2020, which claims priority to Chinese Patent Application No. 201911085794.5, filed on Nov. 8, 2019. The disclosures of the aforementioned applications are hereby incorporated by reference in their entireties.

TECHNICAL FIELD

Embodiments of this application relate to the technical field of energy storage devices, and in particular, to a battery pack and an apparatus.

BACKGROUND

A battery pack serves an important part of a new energy vehicle, and therefore safety performance of the battery pack is very important. A battery pack includes a first box body and a plurality of battery cells accommodated in the first box body. The battery cell has an explosion-proof valve. After thermal runaway occurs in the battery cell, the explosion-proof valve bursts to release internal air pressure and heat from the battery cell.

However, if thermal runaway occurs in one battery cell, heat released from an explosion-proof valve of that battery cell will lead to chain runaway of other battery cells. Therefore, it is necessary to design a new battery pack to prevent thermal runaway of one battery cell from affecting other battery cells.

SUMMARY

This application provides a battery pack and an apparatus, in an attempt to resolve the foregoing prior-art problem and improve safety performance of batteries.

A first aspect of this application provides a battery pack, including:

a first box body, including a frame and a cross beam, where the cross beam is disposed within the frame, and the cross beam has a hollow structure and is provided with an exhaust vent;

a baffle plate, connected to the cross beam and sealing the exhaust vent; and a battery cell, accommodated in the first box body and including an explosion-proof valve, where the explosion-proof valve faces towards the baffle plate.

The baffle plate is configured to exit a state of sealing the exhaust vent when the explosion-proof valve of the battery cell bursts.

In this way, on the one hand, air pressure released by the battery cell can be discharged into the cross beam, thereby reducing internal air pressure of the first box body; on the other hand, heat released by the battery cell is not directly discharged towards other battery cells to avoid thermal runaway of other adjacent battery cells, thereby resolving a safety problem of a battery pack in the prior art and improving safety performance of the battery pack.

In one possible implementation, a melting point of the baffle plate is lower than a melting point of the cross beam; and/or a wall thickness of the baffle plate is less than a wall thickness of the cross beam.

In a possible implementation, the cross beam includes a top plate and two side plates; the two side plates are connected to two ends of the top plate, respectively; and the exhaust vent is provided in the side plate.

In a possible implementation, the first box body further includes a protective plate disposed within the cross beam, and the protective plate is located between the two side plates.

On the one hand, the protective plate can guide heat and gas to the ground below the first box body, and serve to protect adjacent battery cells. On the other hand, when two battery cells are disposed opposite each other, explosion-proof valves of the two battery cells are also disposed opposite each other. Disposition of the protective plate can prevent heat and air pressure released by a battery cell in thermal runaway from breaking through the side plate and directly rushing to the opposite explosion-proof valve, resulting in safety problems.

In a possible implementation, the battery cell is provided in plurality, the plurality of battery cells is grouped into a first battery group and a second battery group, and the cross beam is located between the first battery group and the second battery group.

In a possible implementation, the exhaust vent corresponding to the explosion-proof valve of the battery cell of the first battery group is provided in one of the side plates; and the exhaust vent corresponding to the explosion-proof valve of the battery cell of the second battery group is provided in the other side plate.

In a possible implementation, the plurality of battery cells are stacked along a length direction Y and a height direction Z of the first box body; and the exhaust vent is provided in plurality, and the plurality of exhaust vents are arranged along the length direction Y and the height direction Z.

In a possible implementation, the first box body further includes a fastening member disposed within the cross beam, and the fastening member is connected to the protective plate, so that the protective plate extends along the height direction Z. The fastening member is provided to make the protective plate securely connected to an inside of the cross beam.

In a possible implementation, the fastening member includes a first fastening plate and a second fastening plate; and the protective plate is sandwiched between the first fastening plate and the second fastening plate.

In a possible implementation, the protective plate is a mica plate. The mica plate has a relatively high melting point. The protective plate is not blown or broken down even if relatively high heat is emitted from the exhaust vent, thereby ensuring that the heat and gas released by the battery cell in thermal runaway is not ejected to the adjacent battery cells on the opposite side to cause safety problems.

In a possible implementation, the first box body includes a base plate.

Both the frame and the cross beam are connected to one side of the base plate. The base plate is used to support the battery cell. The frame, the cross beam, and the base plate may be fixedly connected by welding, so as to ensure overall rigidity and sealing performance of the first box body.

In a possible implementation, the base plate is provided with an exhaust passage communicating with the inside of the cross beam.

The inside of the cross beam communicates with an outside of the first box body through the exhaust passage. In a possible implementation, both the exhaust passage and the cross beam extend along the length direction Y of the first box body.

A second aspect of this application provides an apparatus, including:

the battery pack described above, where the battery pack is configured to provide electric energy.

The technical solutions of this application can achieve the following beneficial effects:

According to the battery pack and the apparatus that are provided in this application, the exhaust vent is provided in the cross beam of the first box body in the battery pack, and the baffle plate is provided at the exhaust vent. When thermal runaway occurs in a battery cell, an explosion-proof valve of the battery cell bursts, to make the baffle plate exit the state of sealing the exhaust vent. On the one hand, air pressure released by the battery cell may be discharged into the cross beam, thereby reducing internal air pressure of the first box body; on the other hand, heat released by the battery cell is not directly discharged towards other battery cells to avoid thermal runaway of other adjacent battery cells, thereby resolving a safety problem of a battery pack in the prior art and improving safety performance of the battery pack.

It should be understood that the foregoing general description and the following detailed description are only exemplary and are not intended to limit this application.

BRIEF DESCRIPTION OF DRAWINGS

To describe the technical solutions in the specific implementations of this application or in the prior art more clearly, the following briefly describes the accompanying drawings required for describing the specific implementations or the prior art. Apparently, the accompanying drawings in the following description show merely some implementations of this application, and a person of ordinary skill in the art may still derive other drawings from these accompanying drawings without creative efforts.

REFERENCE SIGNS

P. battery pack;
1. first box body;
11. base plate;
111. water cooling passage;
112. exhaust passage;
12. frame;
13. cross beam;
131. top plate;
132. side plate;
132a. exhaust vent;
133. first passage;
134. second passage;
14. accommodating area;
15. baffle plate;
16. protective plate;
17. fastening member;
171. first fastening plate;
172. second fastening plate;
18. cavity;
2. upper box cover;
3. first battery group;
4. second battery group;
5. battery cell; and
51. explosion-proof valve.

The accompanying drawings herein are incorporated into this specification and form a part of this specification, illustrate the embodiments conforming to this application, and are intended to explain the principles of this application together with the specification.

DESCRIPTION OF EMBODIMENTS

The following clearly and completely describes the technical solutions in this application with reference to the accompanying drawings. Apparently, the described embodiments are some but not all of the embodiments of this application. All other embodiments obtained by persons of ordinary skill in the art based on the embodiments of this application without creative efforts shall fall within the protection scope of this application.

The terms used in the embodiments of this application are merely intended to describe specific embodiments, but not intended to limit this application. The singular forms of "a", "the", and "said" used in the embodiments of this application and the appended claims are also intended to include most forms unless other meanings are clearly represented in the context.

It should be understood that the term "and/or" used in this specification describes an association relationship for describing associated objects and represents that three relationships may exist. For example, A and/or B may represent the following three cases: A alone, both A and B, and B alone. In addition, the symbol "/" in this specification generally represents an "or" relationship between associated objects.

It should be noted that the terms such as "upper", "lower", "left", and "right" described in the embodiments of this application are described from angles shown in the figures, and should not be construed as a limitation on the embodiments of this application. In addition, in the context, it should also be understood that when a component is described as being connected "on" or "under" another component, the component may be directly connected "on"

or "under" the another component, or may be indirectly connected "on" or "under" another component through an intermediate component.

Figure 1:
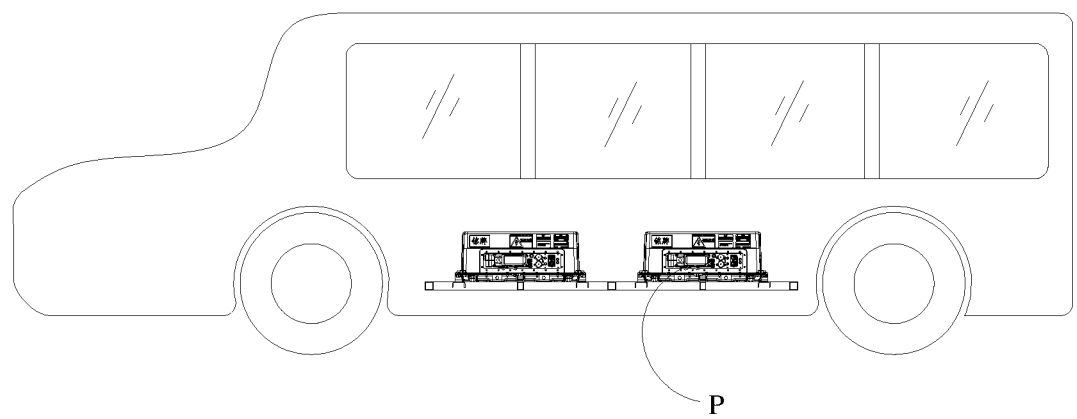
FIG. 1 is a schematic structural diagram of an apparatus according to an embodiment of this application.

FIG. 1 is a schematic structural diagram of an apparatus according to an embodiment of this application. As shown in FIG. 1, this embodiment of this application provides an apparatus. The apparatus may include a vehicle, a ship, a small aircraft, and other mobile devices. FIG. 1 uses the vehicle as an example. The vehicle may include a battery pack P and a vehicle body. The battery pack P is disposed in the vehicle body. The vehicle body is further provided with a drive motor, and the drive motor is electrically connected to the battery pack P. The battery pack P provides electric energy to the drive motor. The drive motor is connected to wheels on the vehicle body through a transmission mechanism to drive travel of the vehicle. In a specific embodiment, the battery pack P may be disposed at the bottom of the vehicle body.

Figure 2:
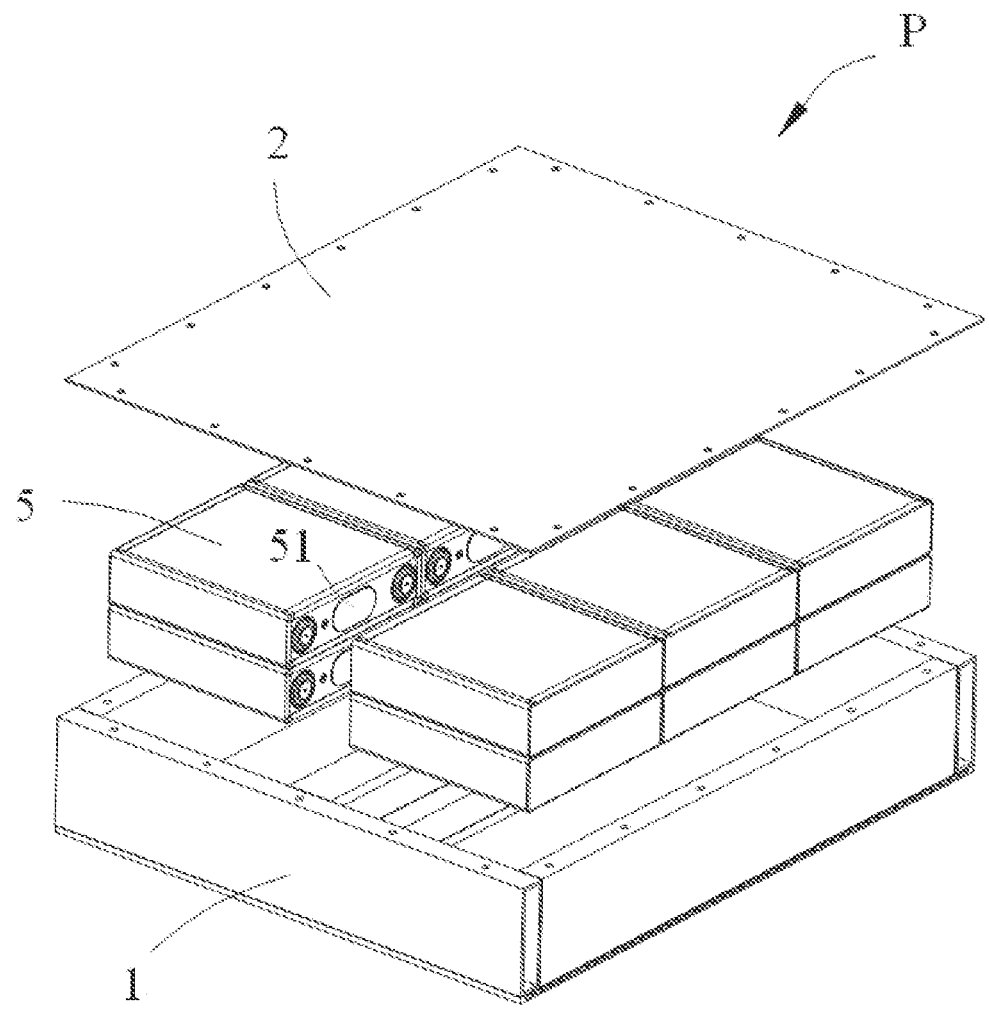
FIG. 2 is a schematic exploded view of a battery pack according to an embodiment of this application.

FIG. 2 is a schematic exploded view of a battery pack according to an embodiment of this application. As shown in FIG. 2, this embodiment of this application provides a battery pack, including a first box body 1, an upper box cover 2, and a battery cell 5. The battery cell 5 is accommodated in the first box body 1, and the upper box cover 2 is fastened to the first box body 1 to enclose the battery cell 5 in the first box body 1.

Figure 3:
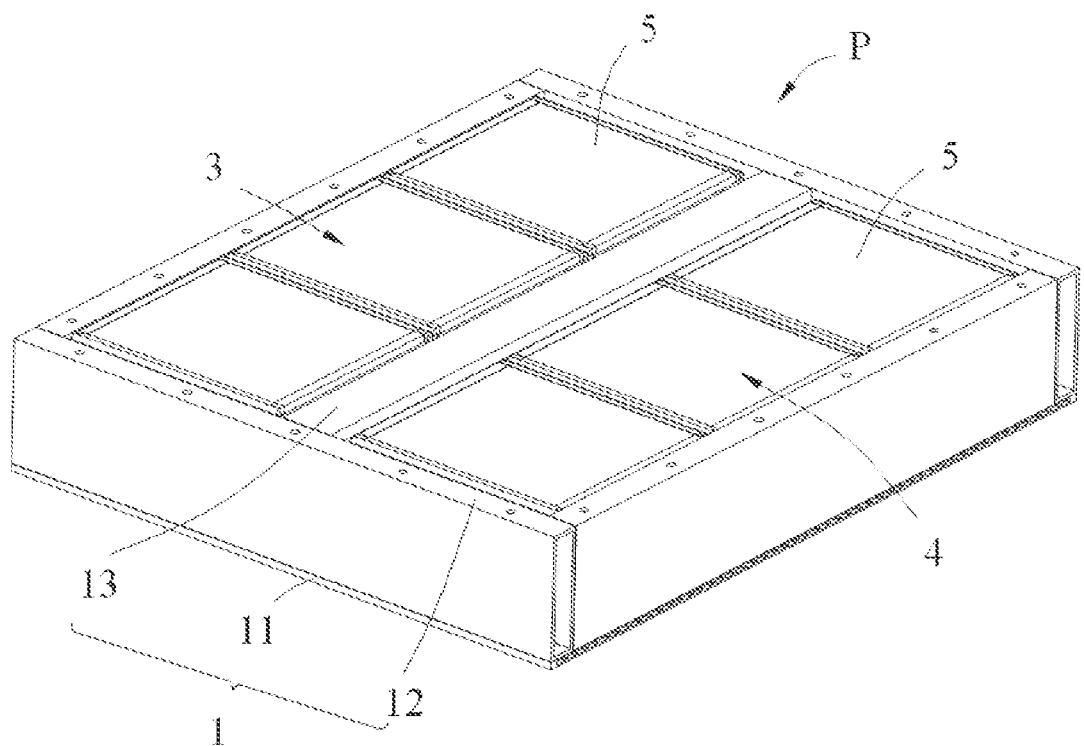
FIG. 3 is a schematic structural diagram of a battery pack without a box cover according to an embodiment of this application.
Figure 4:
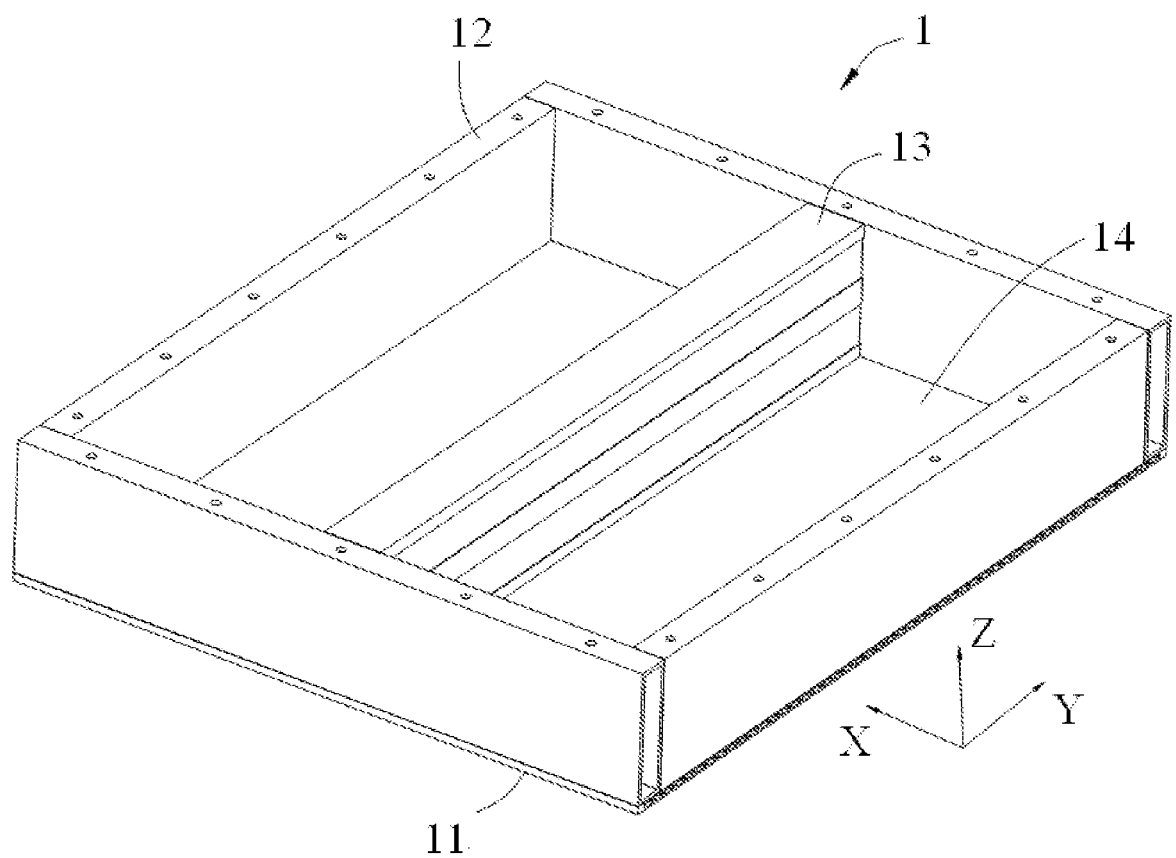
FIG. 4 is a schematic structural diagram of a first box body in a battery pack according to an embodiment of this application.

FIG. 3 is a schematic structural diagram of a battery pack without a box cover according to an embodiment of this application. As shown in FIG. 3, the first box body 1 may include a frame 12 and a cross beam 13, where the cross beam 13 is disposed within the frame 12. FIG. 4 is a schematic structural diagram of a first box body in a battery pack according to an embodiment of this application. As shown in FIG. 4, the frame 12 and the cross beam 13 in the first box body 1 form an accommodating area 14, and the battery cell 5 is accommodated in the accommodating area 14.

Figure 5:
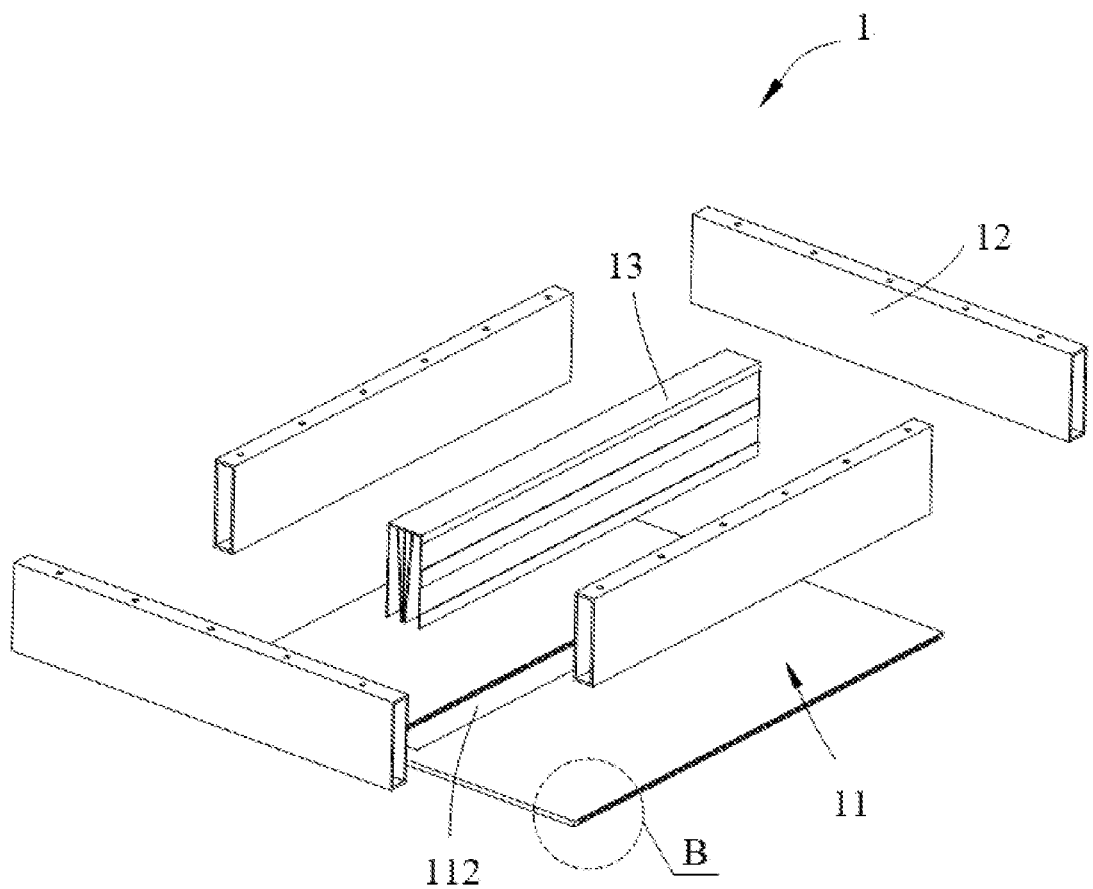
FIG. 5 is a schematic exploded view of a first box body in a battery pack according to an embodiment of this application.
Figure 6:
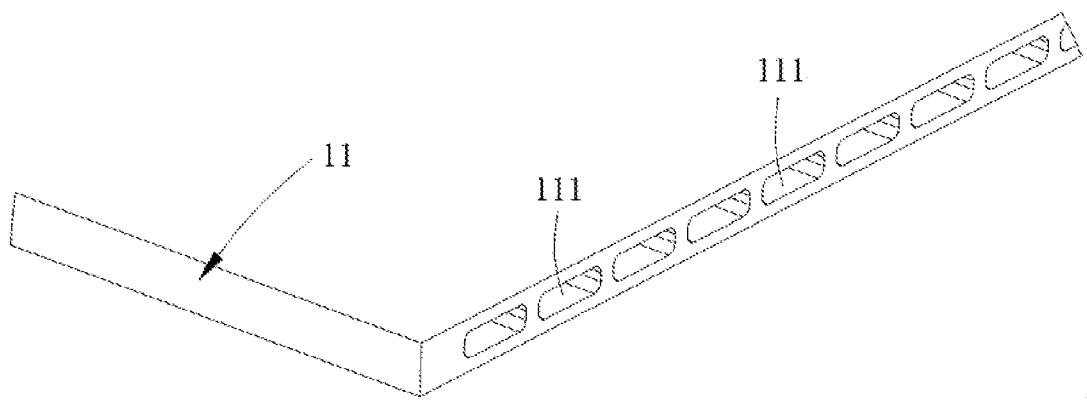
FIG. 6 is an enlarged view of position B in FIG. 5.

FIG. 5 is a schematic exploded view of a first box body in a battery pack according to an embodiment of this application. FIG. 6 is an enlarged view of position B in FIG. 5. As shown in FIG. 5 and FIG. 6, the first box body may further include a base plate 11 for supporting the battery cell 5. The base plate 11 may be provided with a water cooling passage 111, to cool the battery cell 5.

The frame 12, the cross beam 13, and the base plate 11 may be fixedly connected by welding, so as to ensure overall rigidity and sealing performance of the first box body 1.

Referring to FIG. 2 and FIG. 3, in this embodiment, a plurality of battery cells 5 may be provided, and the plurality of battery cells 5 are stacked along a length direction Y and a height direction Z of the first box body 1. Thermal runaway of one battery cell 5 may cause thermal runaway of adjacent battery cells 5, and such chain reaction may cause serious safety problems. The battery pack P and the apparatus provided in the embodiments of this application can resolve this technical problem.

Figure 7:
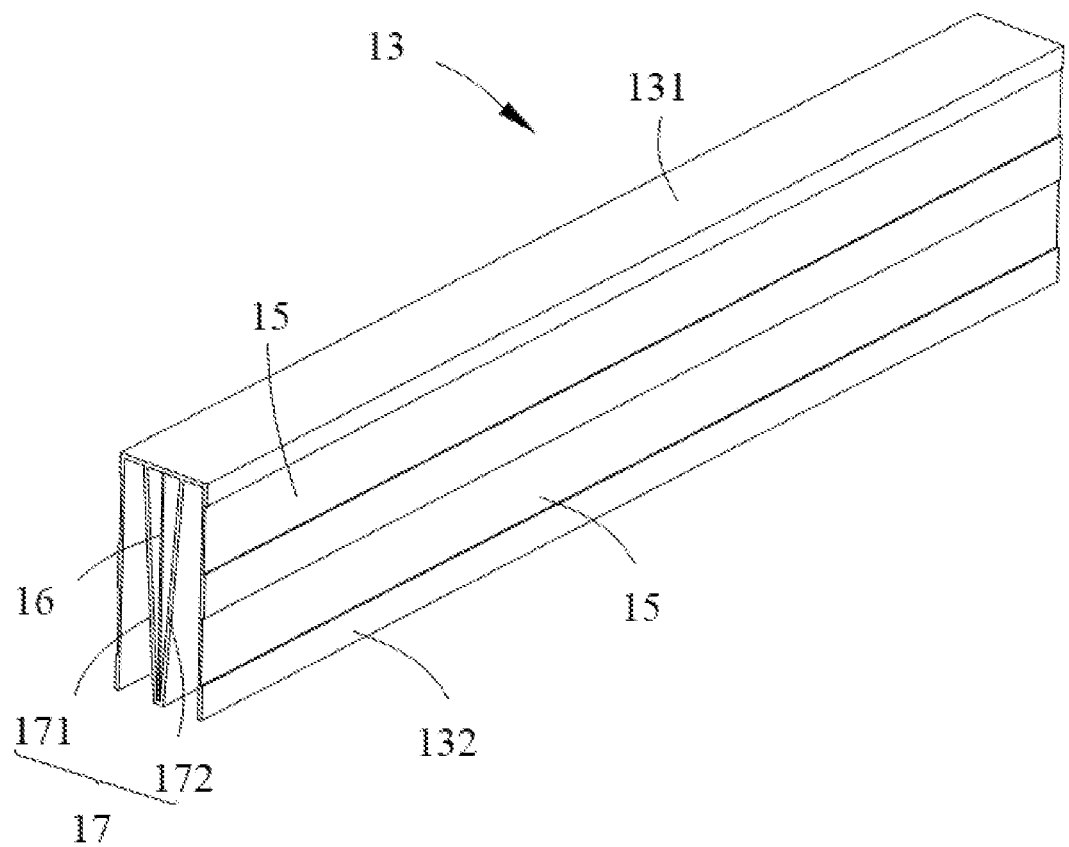
FIG. 7 is a schematic structural diagram of a cross beam of a first box body in a battery pack according to an embodiment of this application.
Figure 8:
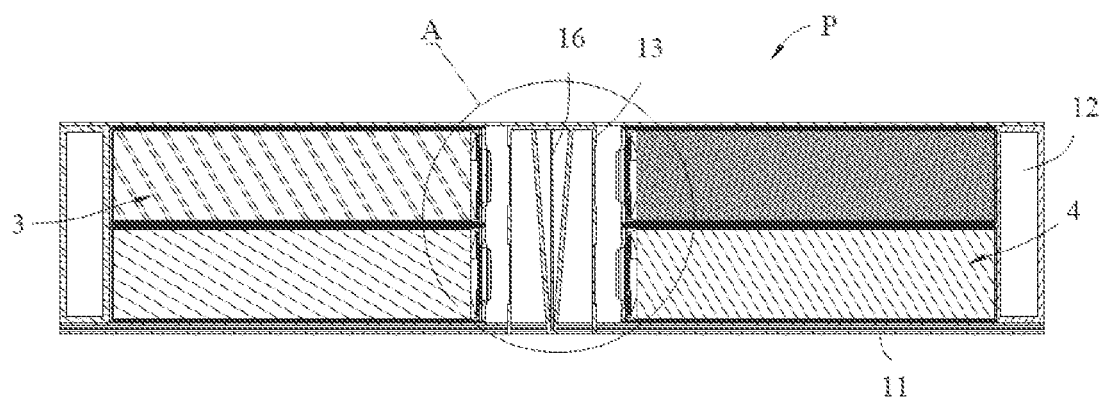
FIG. 8 is a main cross-sectional view of a battery pack according to an embodiment of this application.
Figure 9:
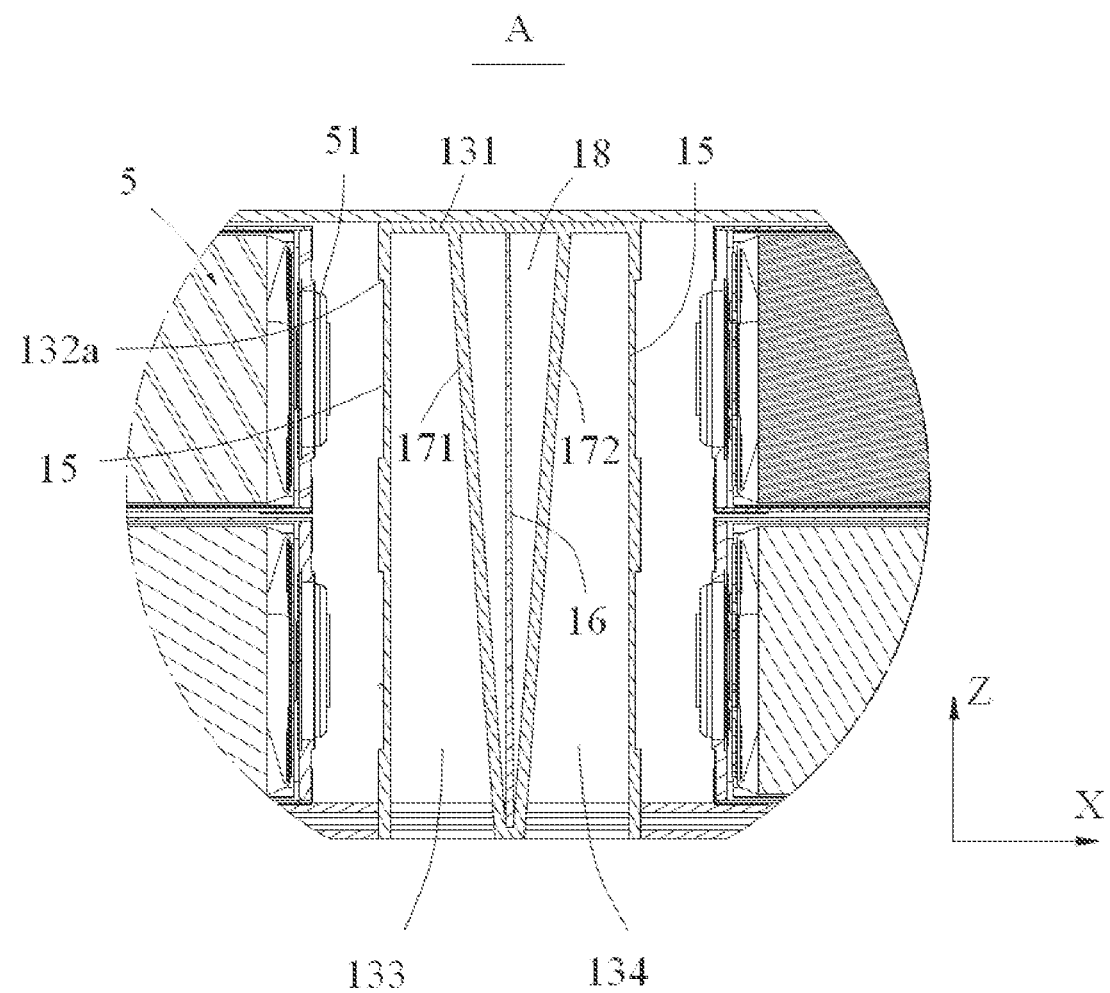
FIG. 9 is an enlarged view of position A in FIG. 8.
Figure 10:
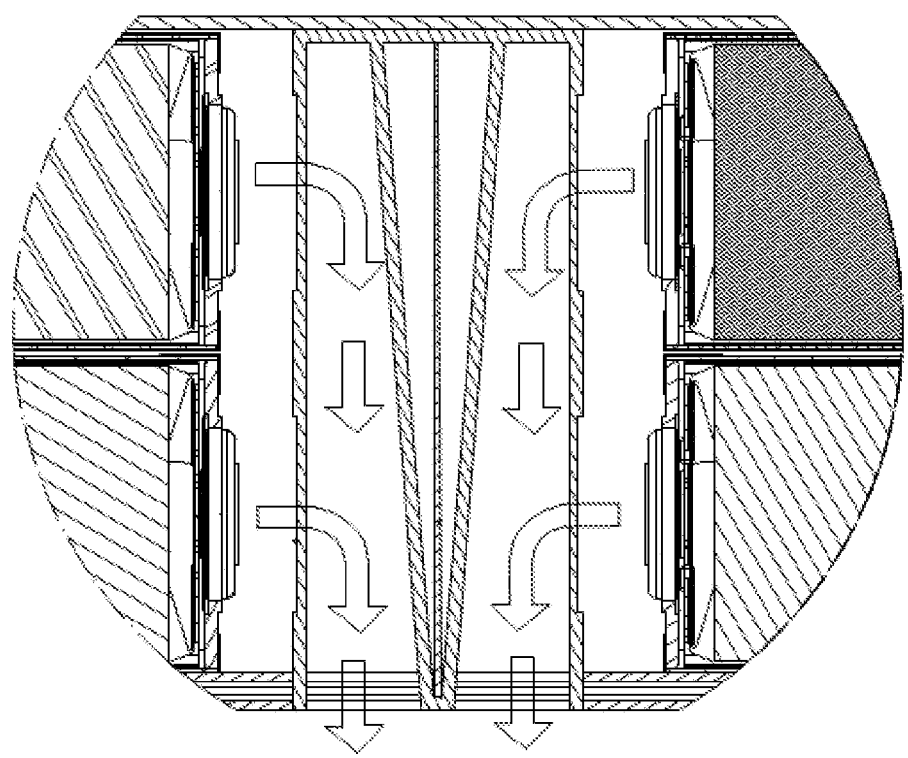
FIG. 10 is a schematic diagram of working principles of a battery pack according to an embodiment of this application.
Figure 11:
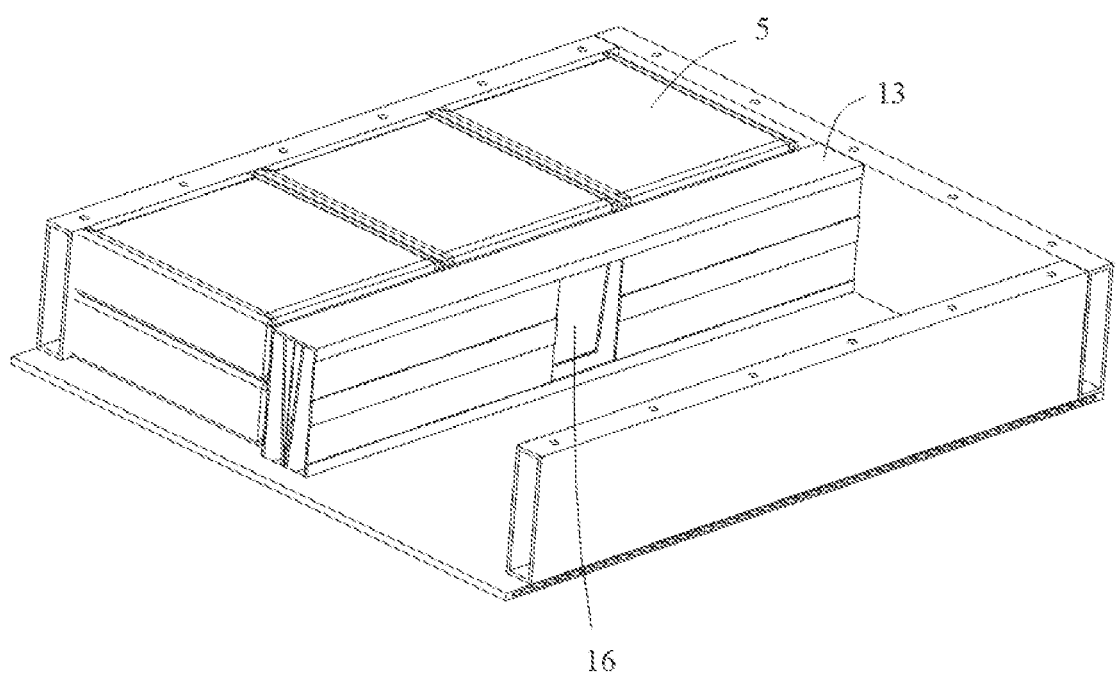
FIG. 11 is a schematic diagram of a partial structure of a battery pack according to an embodiment of this application.

FIG. 7 is a schematic structural diagram of a cross beam of a first box body in a battery pack according to an embodiment of this application. FIG. 8 is a main cross-sectional view of a battery pack according to an embodiment of this application. FIG. 9 is an enlarged view of position A in FIG. 8. FIG. 10 is a schematic diagram of working principles of a battery pack according to an embodiment of this application. FIG. 11 is a schematic diagram of a partial structure of a battery pack according to an embodiment of this application.

As shown in FIG. 7 to FIG. 11, in the battery pack P provided in the embodiments of this application, the cross beam 13 of the first box body 1 has a hollow structure and is provided with an exhaust vent 132a (referring to FIG. 8), and the battery pack P further includes a baffle plate 15. The baffle plate 15 is connected to the cross beam 13 and seals the exhaust vent 132a. The baffle plate 15 is configured to exit a state of sealing the exhaust vent 132a when the explosion-proof valve 51 of the battery cell 5 bursts. In a normal working state (that is, the battery cell 5 is free of thermal runaway), the explosion-proof valve 51 does not burst. In this case, the baffle plate 15 seals the exhaust vent 132a, to prevent water vapor from entering the accommodating area 14 through the cross beam 13, thereby preventing short circuits of the battery cells 5.

Both ends of the cross beam 13 may be fastened to the frame 12 by welding, to enhance a mechanical connection strength of the cross beam 13. There may be one or more cross beams 13. When there is one cross beam 13, a plurality of battery cells 5 may be provided, and explosion-proof valves 51 of the plurality of battery cells 5 may all face towards the same cross beam 13. When a plurality of cross beams 13 are provided, explosion-proof valves 51 of battery cells 5 in two adjacent rows are disposed opposite each other and face towards the same cross beam 13.

The bottom of the cross beam 13 may be provided with an open structure, so that an inside of the cross beam 13 can communicate with the outside, to discharge gas.

When thermal runaway occurs in a battery cell 5 in the battery pack P, an explosion-proof valve 51 of the battery cell 5 bursts, so that the baffle plate 15 exits the state of sealing the exhaust vent 132a. On the one hand, air pressure released by the battery cell 5 can be discharged into the cross beam 13, to reduce internal air pressure of the accommodating area 14; on the other hand, heat released by the battery cell 5 is not directly discharged towards other battery cells 5, to avoid thermal runaway of the other adjacent battery cells 5, thereby resolving a safety problem of a battery pack in the prior art and improving safety performance of the battery pack.

As a possible implementation, a melting point of the baffle plate 15 may be set to be lower than a melting point of the cross beam 13. When thermal runaway occurs in a battery cell 5, an explosion-proof valve 51 of the battery cell 5 bursts, and heat and air pressure that are released by the battery cell 5 act on the baffle plate 15 to make the baffle plate 15 blown or melted, so that the baffle plate 15 exits the state of sealing the exhaust vent 132a.

As another possible implementation, a wall thickness of the baffle plate 15 may be less than a wall thickness of the cross beam 13. In this embodiment, the baffle plate 15 and the cross beam 13 may be integrally formed, for example, may be made of a same material through laser engraving. Because the wall thickness of the baffle plate 15 is less than the wall thickness of the cross beam 13, when thermal runaway occurs in the battery cell 5, the explosion-proof valve 51 of the battery cell 5 bursts, and the heat and air pressure that are released by the battery cell 5 act on the baffle plate 15 to make the baffle plate 15 blown or melted, so that the baffle plate 15 exits the state of sealing the exhaust vent 132a.

As yet another possible implementation, the melting point of the baffle plate 15 is lower than the melting point of the cross beam 13, and the wall thickness of the baffle plate 15 is less than the wall thickness of the cross beam 13, so that when thermal runaway occurs in the battery cell 5, the baffle plate 15 more easily exits the state of sealing the exhaust vent 132*a*.

As shown in FIG. 7, in one possible implementation, the cross beam 13 includes a top plate 131 and two side plates 132, and the two side plates 132 are connected to two ends of the top plate 131, respectively. Specifically, the side plates 132 may be integrally formed with the top plate 131 through punching, and the exhaust vents 132*a* may be provided in the side plates 132. For the battery cell 5 disposed flat, the explosion-proof valve 51 of the battery cell 5 may face towards the cross beam 13, and the exhaust vent 132*a* is provided in the side plate 132 to make the exhaust vent 132*a* substantially aligned with the explosion-proof valve 51. In this way, when thermal runaway occurs in a battery cell 5 in the battery pack P, the explosion-proof valve 51 of the battery cell 5 bursts, and the heat and the air pressure that are released by the battery cell 5 act on the baffle plate 15 to make the baffle plate 15 quickly broken in response to the thermal runaway, so that the baffle plate 15 exits the state of sealing the exhaust vent 132*a*.

As shown in FIG. 6 to FIG. 8, in one possible implementation, the first box body 1 further includes a protective plate 16 disposed within the cross beam 13, and the protective plate 16 is located between the two side plates 132.

With the protective plate 16 disposed between the two side plates 132, when thermal runaway occurs in a battery cell 5 in the battery pack P, an explosion-proof valve 51 of the battery cell 5 bursts, and the heat and the air pressure that are released by the battery cell 5 act on the baffle plate 15 to make the baffle plate 15 broken, so that the baffle plate 15 exits the state of sealing the exhaust vent 132*a*. The heat and the air pressure that are released by the battery cell 5 impinge on the protective plate 16. On the one hand, the protective plate 16 can guide the heat and gas to the ground below the first box body 1, and serve to protect the adjacent battery cells 5. On the other hand, when the two battery cells 5 are disposed opposite each other, the explosion-proof valves 51 of the two battery cells 5 are also disposed opposite each other. Disposition of the protective plate 16 can prevent the heat and air pressure released by the battery cell 5 in thermal runway from breaking through the side plate 132 and directly rushing to the opposite explosion-proof valve 51, resulting in safety problems.

Specifically, referring to FIG. 8 and FIG. 9, in a specific implementation, the battery cell 5 is provided in plurality, and the plurality of battery cells 5 are grouped into a first battery group 3 and a second battery group 4. The cross beam 13 is located between the first battery group 3 and the second battery group 4.

In this embodiment, the plurality of battery cells 5 are disposed flat in the first box body 1, and the explosion-proof valves 51 of the grouped battery cells 5 may all face towards the same cross beam 13, so that special treatment can be performed on the cross beam 13. As shown in FIG. 9, the exhaust vent 132*a* may be provided in the side plate 132 of the cross beam 13, and the baffle plate 15 may be disposed at the exhaust vent 132*a*.

The cross beam 13 is disposed between the first battery group 3 and the second battery group 4, so that the explosion-proof valves 51 of the battery cells 5 face towards the same cross beam 13. When thermal runaway occurs, a corresponding baffle plate 15 on the cross beam 13 exits the state of sealing the exhaust vent 132*a*, to avoid thermal runaway in chain. In this embodiment, a structure of the first box body 1 is simple, and all the cross beams 13 and the frame 12 do not require special treatment, relatively low in manufacturing costs.

In a specific implementation, an exhaust vent 132*a* corresponding to an explosion-proof valve 51 of a battery cell 5 in the first battery group 3 is provided in one of the side plates 132; and an exhaust vent 132*a* corresponding to an explosion-proof valve 51 of a battery cell 5 in the second battery group 4 is provided in the other side plate 132.

In this embodiment, the two side plates 132 are each provided with exhaust vents 132*a*, so that each explosion-proof valve 51 in the two battery groups (the first battery group 3 and the second battery group 4) may correspond to one exhaust vent 132*a* and one baffle plate 15. When any one of the explosion-proof valves 51 bursts, the corresponding baffle plate 15 can come off the corresponding exhaust vent 132*a*, so that the heat and the air pressure that are released by the battery cell 5 in thermal runaway can be discharged in a timely manner, thereby avoiding thermal runaway of adjacent battery cells 5.

In a specific implementation, the plurality of battery cells 5 are stacked along the length direction Y and the height direction Z of the first box body 1. The exhaust vent 132*a* is provided in plurality, and the plurality of exhaust vents 132*a* are arranged along the length direction Y and the height direction Z.

Referring to FIG. 9, each explosion-proof valve 51 corresponds to one exhaust vent 132*a*, and a plurality of exhaust vents 132*a* are arranged in the length direction Y. In the height direction Z, the battery cells 5 are stacked, and therefore, a plurality of exhaust vents 132*a* are arranged in the height direction Z.

Referring to FIG. 7 and FIG. 9, in a specific implementation, the first box body 1 further includes a fastening member 17 disposed within the cross beam 13, and the fastening member 17 is connected to the protective plate 16, so that the protective plate 16 extends along the height direction Z.

The fastening member 17 is provided to make the protective plate 16 securely connected to the inside of the cross beam 13. The protective plate 16 extends along the height direction Z, and may simultaneously correspond to a plurality of battery cells 5 in the height direction Z, so that the plurality of battery cells 5 share one protective plate 16, featuring more overall and reliable protective effects and a simple structure.

In a specific implementation, as shown in FIG. 9, the fastening member 17 includes a first fastening plate 171 and a second fastening plate 172, and the protective plate 16 is sandwiched between the first fastening plate 171 and the second fastening plate 172.

A first end of the first fastening plate 171 is connected to the top plate 131, and a first end of the second fastening plate 172 is connected to the top plate 131. A second end of the first fastening plate 171 is connected to a second end of the second fastening plate 172. The first fastening plate 171, the second fastening plate 172, and the top plate 131 form a cavity 18, and the protective plate 16 is fastened in the cavity 18.

Specifically, a first end of the protective plate 16 may be fastened to the first fastening plate 171 and the second fastening plate 172 by welding, and a second end of the protective plate 16 may be fastened to the top plate 131 of the cross beam 13 by welding.

In this embodiment, the first fastening plate 171, the second fastening plate 172, and the top plate 131 of the cross beam 13 form an inverted triangle cavity 18. Once the baffle plate 15 comes off the exhaust vent 132a, the inverted triangle cavity 18 can serve to support the protective plate 16, so as to prevent the protective plate 16 from being impinged and detaching.

In this embodiment, the first fastening plate 171, the top plate 131, and one side plate 132 can form a first passage 133, and the second fastening plate 172, the top plate 131, and the other side plate 132 can form a second passage 134. When the baffle plate 15 comes off the exhaust vent 132a, the heat and the gas that are released by the battery cell 5 can be discharged to an outside of the first box body 1 through the first passage 133 or the second passage 134, as shown in FIG. 9 and FIG. 10.

FIG. 11 shows the state in which the baffle plate 15 comes off the exhaust vent 132a. At that time, the protective plate 16 is still fixed in the cross beam 13 and has strong impact resistance, thereby not only guiding a discharge direction of the heat and the gas that are released by the battery cell 5, but also avoiding thermal runaway of the adjacent battery cells 5.

In a specific implementation, the protective plate 16 is a mica plate, and the mica plate has a relatively high melting point. The protective plate 16 is not blown or broken down even if relatively high heat is emitted from the exhaust vent 132a, thereby ensuring that the heat and gas released by the battery cell 5 in thermal runaway is not ejected to the adjacent battery cells 5 on the opposite side to cause safety problems.

In a specific implementation, the first box body 1 includes a base plate 11, and as described above, the base plate 11 is used to support the battery cell 5. Both the frame 12 and the cross beam 13 may be connected to one side of the base plate 11, and the base plate 11 may be provided with a water cooling passage 111. The water cooling passage 111 may be elongated, and is provided inside the base plate 11 to match an arrangement direction of the battery cells 5. During charging and discharging of the battery cell 5, the battery cell 5 generates heat to some extent, and then the battery cell 5 can be cooled through the water cooling passage 111 provided in the base plate 11.

In a specific implementation, as shown in FIG. 5, the base plate 11 is provided with an exhaust passage 112 communicating with the inside of the cross beam 13, and the inside of the cross beam 13 communicates with the outside of the first box body 1 through the exhaust passage 112.

The exhaust passage 112 communicating with the inside of the cross beam 13. When thermal runaway occurs in a battery cell 5 in the battery pack P, an explosion-proof valve 51 of the battery cell 5 bursts, so that the baffle plate 15 exits the state of sealing the exhaust vent 132a. The gas released by the battery cell 5 in thermal runaway may be discharged into the cross beam 13 and enters the inside of the cross beam 13. Specifically, the gas released by the battery cell 5 may be discharged to the outside of the battery pack P through the first passage 133 and the second passage 134, and the exhaust passage 112 that is provided at the bottom of the base plate 11.

In a specific implementation, referring to FIG. 4 and FIG. 5, the exhaust passage 112 and the cross beam 13 extend along the length direction Y of the first box body 1. The exhaust passage 112 corresponds to the cross beam 13, and is provided in a manner of arranging the battery cells 5 along the length direction Y. After the gas released by the battery cell 5 in thermal runaway enters the inside of the cross beam 13, the high-temperature gas can be fully released because the exhaust passage 112 extends in the length direction Y, thereby avoiding chain reaction.

The foregoing descriptions are merely embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A battery pack, comprising:
    a first box body, comprising a frame and a cross beam, wherein the cross beam is disposed within the frame, and the cross beam has a hollow structure and is provided with an exhaust vent;
    a baffle plate, connected to the cross beam and sealing the exhaust vent; and
    a battery cell, accommodated in the first box body and comprising an explosion-proof valve, wherein the explosion-proof valve faces towards the baffle plate; and
    the baffle plate is configured to exit a state of sealing the exhaust vent when the explosion-proof valve of the battery cell bursts;
    wherein a melting point of the baffle plate is lower than a melting point of the cross beam;
    wherein a wall thickness of the baffle plate is less than a wall thickness of the cross beam;
    wherein the cross beam comprises a top plate and two side plates, and the two side plates are connected to two ends of the top plate, respectively; and
    the exhaust vent is provided in the side plate.

2. The battery pack according to claim 1, wherein the first box body further comprises a protective plate disposed within the cross beam, and the protective plate is located between the two side plates.

3. The battery pack according to claim 1, wherein the battery cell is provided in plurality, the plurality of battery cells are grouped into a first battery group and a second battery group, and the cross beam is located between the first battery group and the second battery group.

4. The battery pack according to claim 3, wherein the exhaust vent corresponding to the explosion-proof valve of the battery cell of the first battery group is provided in one of the side plates; and
    the exhaust vent corresponding to the explosion-proof valve of the battery cell of the second battery group is provided in the other side plate.

5. The battery pack according to claim 3, wherein the plurality of battery cells are stacked along a length direction and a height direction of the first box body; and
    the exhaust vent is provided in plurality, and the plurality of exhaust vents are arranged along the length direction and the height direction.

6. The battery pack according to claim 1, wherein the first box body further comprises a fastening member disposed within the cross beam, and the fastening member is connected to the protective plate, so that the protective plate extends along the height direction.

7. The battery pack according to claim 6, wherein the fastening member comprises a first fastening plate and a second fastening plate; and the protective plate is sandwiched between the first fastening plate and the second fastening plate.

8. The battery pack according to claim 1, wherein the protective plate is a mica plate.

9. The battery pack according to claim 1, wherein the first box body comprises a base plate; and the frame and the cross beam are both connected to one side of the base plate.

10. The battery pack according to claim 9, wherein
the base plate is provided with an exhaust passage communicating with an inside of the cross beam; and
the inside of the cross beam communicates with an outside of the first box body through the exhaust passage.

11. The battery pack according to claim 10, wherein both the exhaust passage and the cross beam extend along the length direction of the first box body.

12. An apparatus, comprising:
a battery pack, wherein the battery pack is configured to provide electric energy, wherein the battery pack comprising:
a first box body, comprising a frame and a cross beam, wherein the cross beam is disposed within the frame, and the cross beam has a hollow structure and is provided with an exhaust vent;
a baffle plate, connected to the cross beam and sealing the exhaust vent; and
a battery cell, accommodated in the first box body and comprising an explosion-proof valve, wherein the explosion-proof valve faces towards the baffle plate; and
the baffle plate is configured to exit a state of sealing the exhaust vent when the explosion-proof valve of the battery cell bursts;
wherein a melting point of the baffle plate is lower than a melting point of the cross beam; and/or
a wall thickness of the baffle plate is less than a wall thickness of the cross beam;
wherein the cross beam comprises a top plate and two side plates, and the two side plates are connected to two ends of the top plate, respectively; and
the exhaust vent is provided in the side plate.

13. The apparatus according to claim 12, wherein the first box body further comprises a protective plate disposed within the cross beam, and the protective plate is located between the two side plates.

14. The apparatus according to claim 13, wherein the battery cell is provided in plurality, the plurality of battery cells are grouped into a first battery group and a second battery group, and the cross beam is located between the first battery group and the second battery group.

15. The apparatus according to claim 14, wherein the exhaust vent corresponding to the explosion-proof valve of the battery cell of the first battery group is provided in one of the side plates; and
the exhaust vent corresponding to the explosion-proof valve of the battery cell of the second battery group is provided in the other side plate.

* * * * *